US010916741B1

United States Patent
Dafoe et al.

(10) Patent No.: US 10,916,741 B1
(45) Date of Patent: Feb. 9, 2021

(54) METALLIZED CURRENT COLLECTOR DEVICES AND MATERIALS

(71) Applicant: Apple Inc., Cupertino, CA (US)

(72) Inventors: Donald G. Dafoe, San Jose, CA (US); Andrew C. Chu, Cupertino, CA (US); Christopher T. Campbell, San Jose, CA (US); Tobias Zeilinger, Palo Alto, CA (US); Kenzo Nagai, Fremont, CA (US); Qingcheng Zeng, San Jose, CA (US)

(*) Notice: Subject to any disclaimer, the term of this patent is extended or adjusted under 35 U.S.C. 154(b) by 129 days.

(21) Appl. No.: 16/049,250

(22) Filed: Jul. 30, 2018

Related U.S. Application Data

(60) Provisional application No. 62/542,693, filed on Aug. 8, 2017.

(51) Int. Cl.
*H01M 2/08* (2006.01)
*H01M 4/64* (2006.01)
*H01M 2/32* (2006.01)
*H01M 2/02* (2006.01)

(52) U.S. Cl.
CPC ............ *H01M 2/08* (2013.01); *H01M 2/0235* (2013.01); *H01M 2/32* (2013.01); *H01M 4/64* (2013.01)

(58) Field of Classification Search
CPC combination set(s) only.
See application file for complete search history.

(56) References Cited

U.S. PATENT DOCUMENTS

| 4,374,186 A | 2/1983 | McCartney et al. |
| 4,567,119 A | 1/1986 | Lim |
| 5,162,172 A | 11/1992 | Kaun |
| 5,254,415 A | 10/1993 | Williams et al. |
| 5,367,431 A | 11/1994 | Kunishi et al. |
| 8,357,469 B2 | 1/2013 | Shaffer, II et al. |
| 9,142,811 B2 | 9/2015 | Chami |
| 2002/0146620 A1 | 10/2002 | Connell |

(Continued)

FOREIGN PATENT DOCUMENTS

| CN | 101809801 A | 8/2010 |
| CN | 102272977 A | 12/2011 |

(Continued)

OTHER PUBLICATIONS

U.S. Appl. No. 15/962,133, "Non-Final Office Action", dated Jan. 21, 2020, 37 pages.

(Continued)

*Primary Examiner* — Christopher P Domone
(74) *Attorney, Agent, or Firm* — Kilpatrick Townsend & Stockton

(57) ABSTRACT

Energy storage devices, battery cells, and batteries of the present technology may include a first current collector and a second current collector. At least one of the first current collector and the second current collector may be a non-metal current collector. The battery cell may include a seal between an edge region of the first current collector and an edge region of the second current collector. The seal may contact a first surface of the first current collector and a first surface of the second current collector. The battery cell may also include a metal material coupled with the non-metal current collector on a second surface of the non-metal current collector opposite the first surface.

18 Claims, 4 Drawing Sheets

(56) References Cited

U.S. PATENT DOCUMENTS

| | | |
|---|---|---|
| 2003/0027051 A1 | 2/2003 | Kejha et al. |
| 2005/0106456 A1 | 5/2005 | Puester et al. |
| 2009/0068531 A1 | 3/2009 | Sawa et al. |
| 2009/0136832 A1 | 5/2009 | Aihara et al. |
| 2009/0233175 A1 | 9/2009 | Kelley et al. |
| 2010/0134942 A1 | 6/2010 | Wang et al. |
| 2011/0294007 A1 | 12/2011 | Hosaka et al. |
| 2012/0156552 A1 | 6/2012 | Miyazaki et al. |
| 2012/0189896 A1 | 7/2012 | Zhou et al. |
| 2013/0065106 A1 | 3/2013 | Faust et al. |
| 2016/0049679 A1 | 2/2016 | Stevens et al. |
| 2016/0099456 A1 | 4/2016 | Kwon et al. |
| 2016/0197352 A1 | 7/2016 | Blaser et al. |
| 2016/0248113 A1 | 8/2016 | He et al. |
| 2017/0214057 A1 | 7/2017 | Kotik et al. |
| 2018/0226654 A1* | 8/2018 | Ohsawa ................ H01M 4/667 |

FOREIGN PATENT DOCUMENTS

| | | |
|---|---|---|
| CN | 103165920 A | 6/2013 |
| CN | 103222098 A | 7/2013 |
| CN | 103548196 A | 1/2014 |
| CN | 103904294 A | 7/2014 |
| CN | 107851747 A | 3/2018 |
| EP | 2892097 A1 | 7/2015 |
| EP | 3317907 A | 5/2018 |
| JP | 06503442 A | 4/1994 |
| JP | 2005005163 A | 1/2005 |
| JP | 2006012556 A | 1/2006 |
| JP | 2007012584 A | 1/2007 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018519646 | 7/2018 |
| KR | 20130066795 A | 6/2013 |
| WO | 8504287 A1 | 9/1985 |
| WO | 9210861 A1 | 6/1992 |
| WO | 2017007827 | 1/2017 |
| WO | 2017007827 A1 | 1/2017 |
| WO | 2018057566 A1 | 3/2018 |
| WO | 2018195372 A1 | 10/2018 |
| WO | 2018213601 A2 | 11/2018 |

OTHER PUBLICATIONS

Chinese Patent Application No. 201680039891.9, "Office Action", dated Jan. 6, 2020, 21 pages.
International Patent Application No. PCT/US2017/052413, "International Preliminary Report on Patentability", dated Apr. 4, 2019, 12 pages.
Korea Patent Application No. 10-2018-7000263, "Office Action", dated Sep. 27, 2019, 16 pages.
PCT/US2018/028472, "International Preliminary Report on Patentability", dated Oct. 31, 2019, 10 pages.
Korean Patent Application No. 10-2018-7000263, "Office Action", dated Feb. 28, 2019, 5 pages.
U.S. Appl. No. 15/742,009, "Restriction Requirement", dated Jun. 11, 2019, 8 pages.
Europe Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
U.S. Appl. No. 15/742,009, "Non-Final Office Action", dated Nov. 15, 2019, 14 pages.
Japan Patent Appl. No. 2018-500449, "Notice of Decision to Grant", dated Nov. 18, 2019, 2 pages.
PCT/US2018/033218, "International Preliminary Report on Patentability", dated Nov. 28, 2019, 9 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
U.S. Appl. No. 16/007,534, "Non-Final Office Action", dated May 5, 2020, 47 pages.
Korean Patent Application No. 10-2018-7000263, "Notice of Decision to Grant", dated Apr. 8, 2020, 2 pages.
U.S. Appl. No. 15/742,009, "Final Office Action", dated Aug. 19, 2020, 13 pages.
U.S. Appl. No. 16/263,890, "Non-Final Office Action", dated Jun. 16, 2020, 9 pages.
Chinese Patent Application No. 201680039891.9, "Office Action", dated Jun. 10, 2020, 18 pages.
U.S. Appl. No. 15/962,133, "Final Office Action", dated Jul. 7, 2020, 23 pages.

* cited by examiner

METALLIZED CURRENT COLLECTOR DEVICES AND MATERIALS

CROSS REFERENCE TO RELATED APPLICATION

This application claims the benefit of U.S. Provisional Application Ser. No. 62/542,693, filed Aug. 8, 2017, the entire disclosure of which is hereby incorporated by reference in its entirety for all purposes.

TECHNICAL FIELD

The present technology relates to batteries and battery components. More specifically, the present technology relates to current collector designs.

BACKGROUND

In battery-powered devices, water permeation into a battery cell may cause device performance issues. Current collectors may provide a path for water vapor ingress into individual cells. Improved designs are needed.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-direction transmission of current may also benefit from the present designs. The current collectors may include a host of features and material configurations as will be described throughout the disclosure.

Energy storage devices, battery cells, and batteries of the present technology may include a first current collector and a second current collector. At least one of the first current collector and the second current collector may be a non-metal current collector. The battery cell may include a seal between an edge region of the first current collector and an edge region of the second current collector. The seal may contact a first surface of the first current collector and a first surface of the second current collector. The battery cell may also include a metal material coupled with the non-metal current collector on a second surface of the non-metal current collector opposite the first surface.

In some embodiments an anode active material may contact the first surface of the first current collector, and a cathode active material may contact the first surface of the second current collector. A gap in coverage may extend across the first surface of the non-metal current collector between the seal and the active material associated with the non-metal current collector. The metal material may be located along a region of the second surface of the non-metal current collector opposite the gap in coverage across the first surface of the non-metal current collector. The metal material may not fully extend across a region of the second surface of the non-metal current collector opposite a region of the first surface of the non-metal current collector contacting the active material associated with the non-metal current collector. In some embodiments, the non-metal current collector may include a polymer current collector, and both the first current collector and the second current collector may include a polymer. The metal material may include aluminum.

The present technology also encompasses multi-cell batteries, which may include a first cell including a first current collector, a first anode, a first cathode, and a second current collector. Exemplary multi-cell batteries may also include a second cell including a third current collector, a second anode, a second cathode, and a fourth current collector. The second current collector and the third current collector may be coupled with one another across a portion of a first surface of each of the second current collector and the third current collector. The multi-cell batteries may also include a first seal between the first current collector and the second current collector. The multi-cell batteries may include a second seal between the third current collector and the fourth current collector. The multi-cell batteries may further include a metal liner coupled with the first surface of each of the second current collector and the third current collector.

In embodiments, the metal liner may extend along the first surface of each of the second current collector and the third current collector proximate an intersection of the second current collector and the third current collector. The multi-cell batteries may also include an insulating tape disposed about an edge region of the first current collector and the second current collector. In some embodiments, the metal liner may extend along the second current collector beneath the insulating tape. The metal liner may be or include aluminum. The second current collector and the third current collector may be or include a polymer. The metal liner may extend proximate an external edge of the second current collector and the third current collector. The first seal may extend a first distance across a second surface opposite the first surface of the second current collector. The metal liner may extend proximate the first distance across the first surface of the second current collector. Additionally, the metal liner may extend beyond the first distance across the first surface of the second current collector towards an exterior edge of the second current collector.

The present technology may also encompass battery cells, which may include a first current collector and a second current collector. The battery cells may include a cathode active material coupled with a first area of a first surface of the first current collector. The battery cells may also include an anode active material coupled with a first area of a first surface of the second current collector. The battery cells may include a seal between a second area of the first surface of the first current collector and coupled with a second area of the first surface of the second current collector. The battery cells may also include a metal material coupled with the first surface of at least one of the first current collector and the second current collector between the first area of the first surface and the second area of the first surface. In some embodiments, the metal material may be or include stainless steel. In some embodiments, the metal material may contact the seal on a first end of the metal material. The metal material may contact one of the anode active material or the cathode active material on a second end of the metal material opposite the first end of the metal material.

Such technology may provide numerous benefits over conventional technology. For example, the present devices may provide improved control of water vapor ingress into a battery cell. Additionally, the designs may allow additional control of electrolyte vapor egress from the battery cell. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
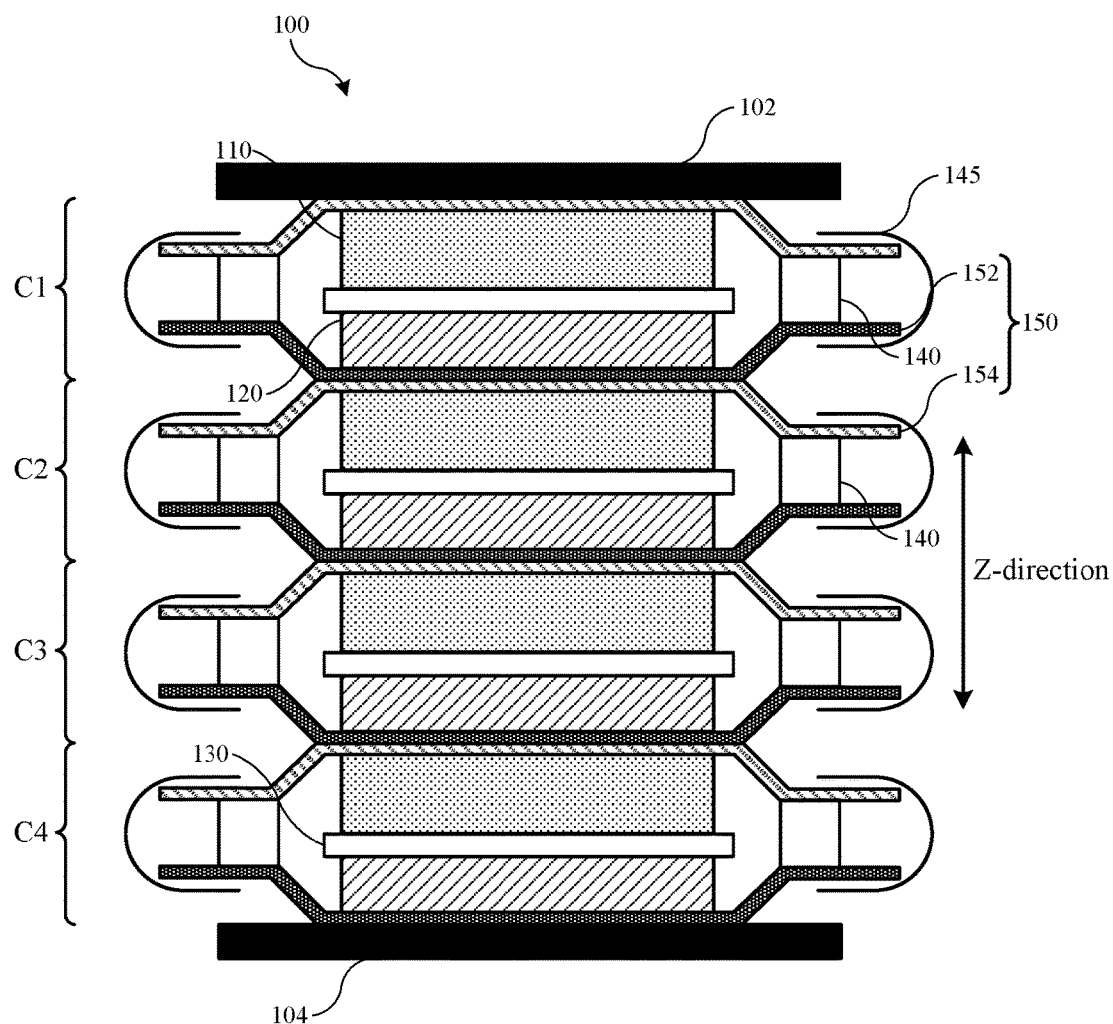
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. As devices are modified to produce alternative schemes, material selection may also change. For example, in certain stacked battery designs, electrical conductivity may be provided in the z-direction through individual cells, while xy-direction of conductivity is reduced or suppressed. This may operate as an alternative to conventional designs utilizing current collectors to distribute electrical energy across an xy-plane of individual current collectors. In either design, current collector materials may include metal current collectors, including copper and aluminum, for example, as well as alternative materials. For example, polymer current collectors may be utilized in various battery cells including conventional designs as well as stacked cell designs where the polymer may provide increased resistance in the xy-plane of the current collector to afford z-directional transfer.

Polymer current collectors may be used and modified to provide particular electrical and mechanical characteristics for a current collector. However, polymer current collectors may be susceptible to increased permeation compared to some conventional current collectors. Metal current collectors, such as a sheet of copper or aluminum, may be characterized by a low or very low water vapor permeation into an individual battery cell. Polymer current collectors, however, may by nature have increased water permeation rates compared to their conventional counterparts. The chain structure of polymers may allow water vapor to seep within and through the structure. In many regions of the current collector, due to additional components or dimensions, the path length is sufficiently long that a rate of permeation may be limited below a threshold allowing adequate cell operation. However, regions remain that may not be adequately protected, and may allow water permeation at higher rates that may impact device functionality or lifetime.

The present technology addresses this characteristic of polymer current collectors by applying a metal material along regions of a polymer current collector that may be susceptible to increased water permeation. The metal, or other material characterized by low or lower permeation rates, may be applied as a barrier to the polymer current collector, which may reduce permeation through the current collector walls and into the battery cell. As an additional benefit, the material may also reduce or provide a barrier against electrolyte vapor release through the polymer chain. Electrolyte vapor may also be capable of escaping through polymer chains, which over time may dry the cell of electrolyte or solvents, which may impact battery performance. The barrier of the present technology, however, may limit or reduce such egress from the cell, which may increase battery life, and aid in maintaining battery performance.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second metal layers can be made of any material known in the art. For example, copper, aluminum, or stainless steel may be used, as well as composite materials having metallic aspects, and non-metallic materials including polymers. In some instances the metals used in the first and second metal layer can be the same or different. The materials selected for the anode and cathode can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
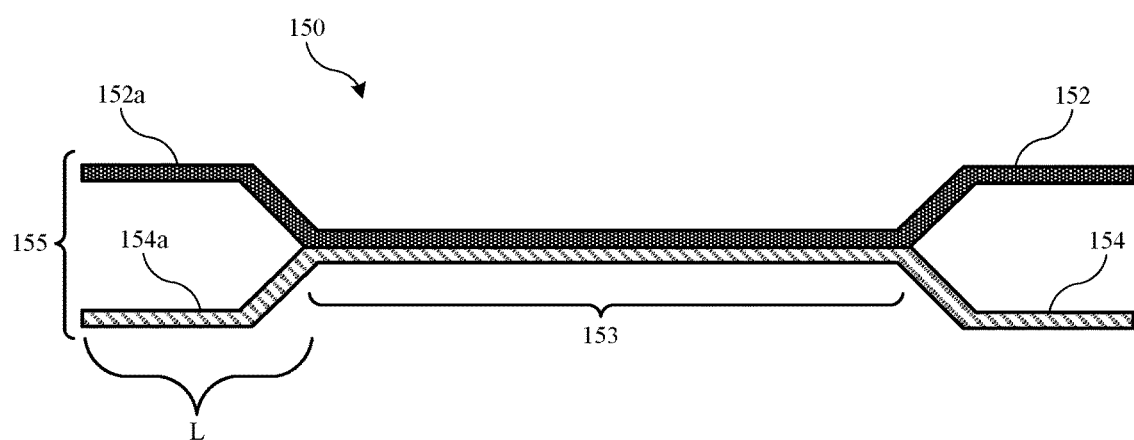
FIG. 2 shows a schematic cross-sectional view of a current collector according to embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include additional designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m.

Figure 3:
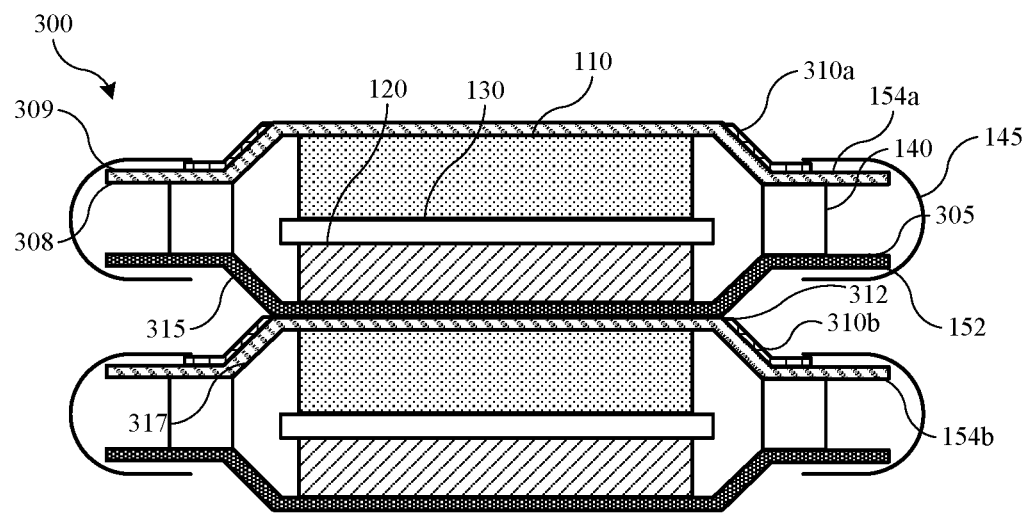
FIG. 3 shows a schematic cross-sectional view of a portion of an energy storage device according to embodiments of the present technology.

Turning to FIG. 3 is shown a schematic cross-sectional view of a portion of an energy storage device 300 according to embodiments of the present technology. As illustrated, energy storage device 300 may include a battery cell, and may include multiple battery cells similar to those discussed above with regard to FIGS. 1 and 2. Energy storage device 300 is shown with two cells coupled together for illustrative purposes, but it is to be understood that energy storage devices encompassed by the present technology may include one or more cells up to hundreds or thousands of coupled cells in some multi-cell battery designs. Similar to FIG. 1, energy storage device 300 may include a number of cells, and each cell may include a first current collector 152 and a second current collector 154. In embodiments, at least one of the first current collector 152 and the second current collector 154 may be a non-metal current collector. As illustrated in FIG. 3, second current collector 154 may be a non-metal current collector. In embodiments, first current collector 152 may be a metal current collector, although first current collector 152 may also be a non-metal current collector, such as will be described below with FIG. 5.

Each cell of energy storage device 300 may also include a seal 140, which may be located between an edge region of the first current collector 152 and an edge region of the second current collector 154. The seal 140 may contact a first surface 305 of the first current collector 152. The seal 140 may also contact a first surface 308 of the second current collector 154. A first metal material 310 may be coupled with the non-metal current collector, which in FIG. 3 is second current collector 154. The metal material 310 may be coupled with a second surface of the non-metal current collector, which may be a second surface 309 opposite the first surface 308 of the second current collector 154.

Additionally within each cell may be electrode components. An anode active material 120 may be disposed on or contact first current collector 152. The anode active material may contact the first surface 305 of first current collector 152. In this way, seal 140 and anode active material 120 may both be in contact with first surface 305 of first current collector 152. Similarly, a cathode active material 110 may be disposed on or contact second current collector 154. The cathode active material 110 may contact the first surface 308 of second current collector 154, and thus cathode active material 110 and seal 140 may both be in contact with first surface 308 of second current collector 154. Exemplary cells may also include a separator 130 disposed between anode active material 120 and cathode active material 110.

As illustrated with exemplary energy storage device 300, the first surface of each current collector may include a portion within the cell structure that is uncoated or uncontacted by other materials. Gap region 315 of first current collector 152 and gap region 317 of second current collector 154 may be located along the first surface of the respective current collectors between the seal and the active material. For example, gap region 315 may be located along first surface 305 of first current collector 152 and encompass a region extending between where seal 140 contacts the first surface 305 and where anode active material 120 contacts the first surface 305. Additionally, gap region 317 may be located along first surface 308 of second current collector 154, and encompass a region extending between where seal 140 contacts the first surface 308 and where cathode active material 110 contacts the first surface 308. These gap regions 315, 317 may define locations where water permeation may occur for non-metal current collectors.

As discussed above, non-metal current collectors, such as polymer current collectors, may be used in devices according to the present technology. These polymeric current collectors may include a polyolefin, such as polypropylene or polyethylene, or other polymers on which components may be disposed. Such polymers may be composed of chain structures different from a matrix structure of a metal, for example. While a metal matrix may provide a structure that may prevent water permeation, the chain structure of a polymer may allow vapor permeation through the structure. Water permeation along a length of polymeric chains may be characterized by a lower permeation rate than a rate through a thickness of polymeric material. Accordingly, gap regions 315, 317 may provide areas where the thickness of material can allow water permeation to occur.

Where seal 140 resides, water permeation may be less prevalent because the water my need to permeate through the polymeric current collector, and then further along a length of seal 140, which may also be a polymer in embodiments, and this length may be on the order of microns, millimeters, centimeters, or more. This increased path length may be sufficient to reduce water permeation below acceptable levels, allowing suitable device operation for the life of the device. Through the gap regions, however, water permeation or electrolyte vapor egress may occur at an increased rate, which may affect device life and operation, because the gap regions may be characterized by a nominal thickness. The thickness of a current collector across such a gap region may be less than one millimeter in embodiments, and may be less than or about 500 µm, less than or about 300 µm, less than or about 100 µm, less than or about 50 µm, less than or about 40 µm, less than or about 30 µm, less than or about 20 µm, less than or about 10 µm, less than or about 5 µm, less than or about 3 µm, less than or about 1 µm, less than or about 500 nm, or less in embodiments. Accordingly, water permeation or electrolyte vapor egress may occur at an increased rate, which in some situations may not be acceptable for particular device standards depending on the particular rate.

Returning to FIG. 3, gap region 317 may be protected by metal material 310, while gap region 315 may not include protection. As noted above, current collector 152 may be a metal current collector, such as copper, for example, and the metal may be characterized by a structure that is less susceptible to water permeation. Accordingly, gap region 317 may not pose an issue for water ingress or electrolyte vapor egress. Current collector 154, however, may be or include a polymer, and gap region 317 may be a region consisting exclusively of polymeric materials. Such a region, which may be characterized by a thickness in the ranges discussed above, may have water permeation rates above acceptable thresholds. Thus, metal material 310 may be disposed on second surface 309, which may create a barrier or simply provide reduced water permeation through gap region 315 of a polymeric or non-metal current collector.

It is to be understood that non-metal current collectors may include metal or conductive material in one or more ways. Exemplary non-metal current collectors may include polymers or non-metal matrices, although certain regions may be modified with metal or conductive components. For example, an exemplary non-metal current collector may include a polymer current collector having certain regions in which there is no metal or conductive material, such as over gap regions 315, 317, which may extend to an exterior edge. However, such non-metal current collectors may include additional regions in which a metal or conductive material has been incorporated, such as previously described. These regions of conductive material may be located where active material may contact the individual current collector. A specific example of such a current collector is included with the example discussed below in conjunction with FIG. 6. However, it is to be understood that the phrase "non-metal current collector" may encompass current collectors including regions having more or less conductive characteristics afforded, in some embodiments, by metal materials.

Metal material 310 may be located along a region of the second surface 309 of second current collector 154 along gap region 317. This region of the second surface 309 may be opposite first surface 308, where the second current collector 154 does not include additional material, such as seal 140 or active material 110. Metal material 310 may extend along second surface 309 for a particular distance. This distance may extend towards a central location of second current collector 154 in a first direction, and towards an exterior edge of second current collector 154 in a second direction opposite the first. In the first direction extending towards the central location of second current collector 154, metal material 310 may extend towards a position on the second surface 309 proximate a position on the first surface 308 on which cathode active material 110 is located. In embodiments, an end plate or a current collector of a subsequent cell may contact current collector 154 along second surface 309. Metal material 310 may extend towards, proximate, or up to an intersection of this additional item with second current collector 154. For example, as illustrated, first current collector 152 may be a component of a battery cell with second current collector 154a, and may additionally contact second current collector 154b. Metal material 310b may extend along second current collector 154b in a first direction towards intersection 312 of first current collector 152 and second current collector 154b, and may extend directly to intersection 312.

Metal material 310 may extend in the first direction towards a central location of second current collector 154 to any particular amount, and in embodiments may extend fully to a center of second current collector 154. In other embodiments, metal material 310 may not fully extend across a region of the second surface 309 of second current collector 154 opposite a region of the first surface of the non-metal current collector contacting cathode active material 110. When extending fully across a length of any current collector, metal material 310 may provide a conductive path along an xy-direction of energy storage device 300. Although this may be acceptable in some embodiments, other embodiments may seek to limit xy-direction conductivity across each cell as previously described. In these embodiments, metal material 310 may not fully extend across any surface of any particular current collector. Additionally, cells may be coupled with adjacent cells along a region of a second surface of a current collector opposite a region of a first surface of the current collector on which active material associated with the current collector has been disposed. Metal material 310 may not fully extend across this region to allow lamination to occur between the non-metal current collector and the adjacent current collector of the following cell.

Figure 4:
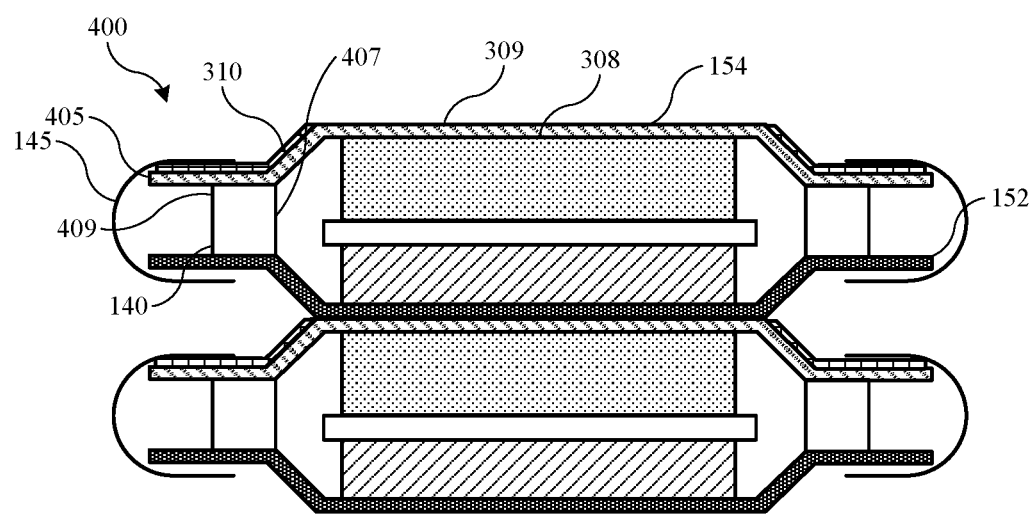
FIG. 4 shows a schematic cross-sectional view of a portion of an energy storage device according to embodiments of the present technology.

Metal material 310 may also extend in a second direction opposite the first direction towards an exterior edge of second current collector 154. Turning to FIG. 4 is shown a schematic cross-sectional view of a portion of an energy storage device 400 according to embodiments of the present technology. Energy storage device 400 may be similar to energy storage device 300 described above, and may include similar components, including a first current collector 152, a second current collector 154, a seal 140, tape 145, and metal material 310. As illustrated, metal material 310 may extend in a second direction towards an exterior edge of second current collector 154. Metal material 310 may fully extend to the exterior edge 405 of second current collector 154, and may extend some lesser distance. For example, seal 140 may extend along first surface 308 of second current collector 154. Seal 140 may be characterized by an inner surface 407 and an outer surface 409. Metal material 310 may extend past a position along second surface 309 opposite a corresponding a position along first surface 308 contacting seal 140 at inner surface 407. Put another way, metal material 310 may overlap on second surface 309 where inner surface 407 of seal 140 contacts first surface 308.

Metal material 310 may also extend in the second direction along second surface 309 towards exterior edge 405 of second current collector 154 within an area covered by tape 145. Tape 145 may provide additional structure that may act as a barrier to water permeation. By overlapping where tape 145 extends across second current collector 154, metal material 310 and tape 145 may provide a continuous barrier along second surface 309 of second current collector 154 from exterior edge 405 to an interior position along second current collector 154, which may be the intersection of second current collector 154 with another structure of energy storage device 400, including a first current collector 152 of an adjacent cell, an end plate, or some other structure that may contact second current collector 154.

Metal material 310 may be any material that may provide a barrier to water permeation through a non-metal current collector, such as a polymer current collector. In some embodiments, metal material 310 may be aluminum, copper, stainless steel, or any other metal-containing material that may be formed or deposited along a non-metal current collector. Because the metal material may be coupled with the current collector outside of the cell, the metal material may not contact electrolyte or other components of the cell, which may allow a variety of materials to be used. The material used may be self-oxidizing in embodiments, or may be specifically treated to reduce corrosion, as the metal material may be exposed to an environment containing air or other corrosive materials. A length or width of metal material 310 across a current collector may be variable as discussed elsewhere, but the metal material may cover up to or more than 500 μm in embodiments, and may be up to, greater than, or about 1 mm, greater than or about 3 mm, greater than or about 5 mm, greater than or about 7 mm, greater than or about 1 cm, greater than or about 10 cm, greater than or about 50 cm, greater than or about 1 m, or more in embodiments. Depending on the size of the battery cell, the amount of gap area to be covered by metal material 310 may be variable.

The thickness of the metal material 310 may be less than 5 μm in embodiments, and may be less than or about 1 μm, less than or about 500 nm, less than or about 200 nm, less than or about 50 nm, less than or about 5 nm, or less in embodiments. Because of the structure of many metals, water permeation may be sufficiently mitigated by any thickness of material. Accordingly, in embodiments the metal material may be applied to a thickness sufficient to produce a continuous coating along the region to which it is applied. The metal material may be sputtered to the non-metal current collector, deposited in various ways including vapor deposition, and may be laminated with a polymer layer. For example, the non-metal current collector may be or include polypropylene in some embodiments, and the metal material may be aluminum laminated with the polypropylene to produce a metalized polypropylene in the region being covered. In some embodiments a non-metal material may be used, which may provide added thickness to reduce water permeation, may be a hydrophobic substance, or may assist in reducing water permeation through a non-metal current collector.

Figure 5:
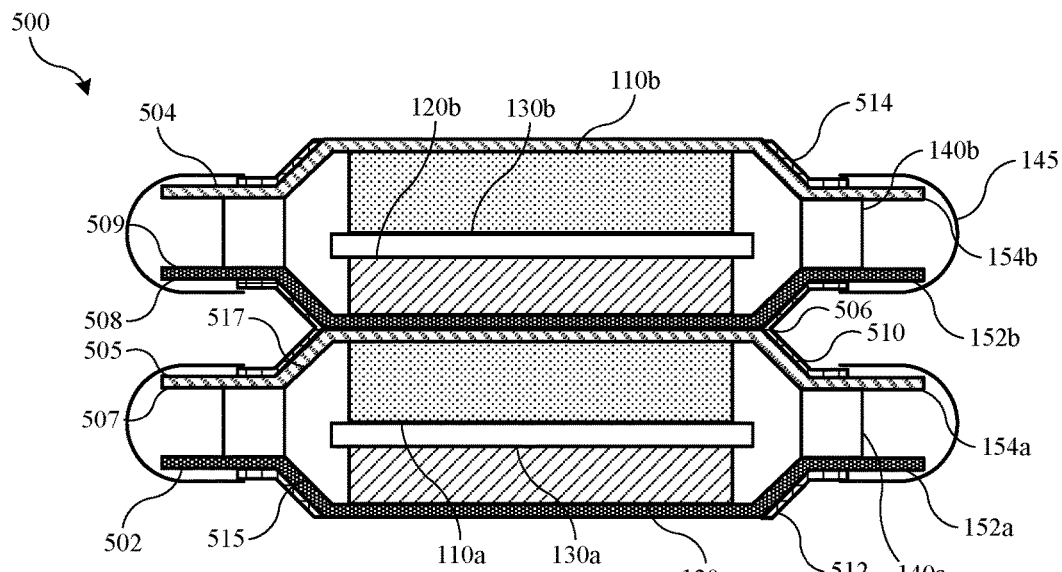
FIG. 5 shows a schematic cross-sectional view of a portion of an energy storage device according to embodiments of the present technology.

FIG. 5 shows a schematic cross-sectional view of a portion of an energy storage device 500 according to embodiments of the present technology. As illustrated, energy storage device 500 may include components similar to energy storage devices 300 and 400 previously described, and may include any of the characteristics, dimensions, or materials discussed above for those structures. Energy storage device 500 may be a multi-cell battery having any number of cells, although two exemplary cells are illustrated. Energy storage device 500 may include a first cell 502 including a first current collector 152a, a second current collector 154a, a first anode material 120a, and a first cathode material 110a, which may be separated from first anode material 120a by separator 130a. Energy storage device 500 may also include a second cell 504 including a third current collector 152b, a fourth current collector 154b, a second anode material 120b, and a second cathode material 110b, which may be separated from second anode material 120b by separated 130b. As illustrated, first cell 502 and second cell 504 may be coupled along a surface of the current collectors. For example, second current collector 154a and third current collector 152b may be coupled with one another across a portion of a first surface 505 of second current collector 154a, and a first surface 508 of third current collector 152b. Each cell may also include seals 140 and tape 145. For example, a first seal 140a may be coupled between the first current collector 152a and the second current collector 154b and a second seal 140b may be coupled between third current collector 152b and fourth current collector 154b.

A metal liner 510 may be coupled with the first surface 505 of the second current collector 154a and a first surface 508 of the third current collector 152b. The metal liner may be aluminum, or any other metal material as previously described. The metal liner 510 may extend along the first surface of each of the second current collector 154a and the third current collector 152b proximate an intersection 506 of the second current collector 154a and the third current collector 152b. In embodiments the metal liner 510 may extend across the intersection 506, and be continuous along the surfaces. In some embodiments an intervening layer of material (not shown) may be positioned between the second current collector 154a and the third current collector 152b, and metal liner 510 may extend across an external edge of the material.

Tape 145 may be an insulating tape, and may be disposed on each of cells 502, 504. Tape 145 may be disposed about an edge region of the first current collector 152a and the second current collector 154a. Metal liner 510 may extend along first surface 505 of second current collector 154a, and may extend beneath tape 145 as previously discussed with regard to energy storage device 400. In some embodiments, metal liner 510 may extend proximate an exterior edge of each current collector as previously described.

Second current collector 154a and third current collector 152b may be non-metal current collectors in embodiments, and may be polymer current collectors. First current collector 152a and fourth current collector 154b may also be polymer current collectors in embodiments, and may include metal liners 512, 514 similar to metal liner 510. The metal liners may cover regions of the current collectors where there is no additional material disposed on an opposite, interior surface of the current collector. For example, gap regions 515, 517 may provide areas for water permeation or release of electrolyte vapors as previously discussed. The gap regions 515, 517 may extend from the intersection 506 of second current collector 154a and third current collector 152b to seals 140. Seals 140 may be positioned along a second surface 507 of second current collector 154a and a second surface 509 of third current collector 152b. The second surfaces 507, 509 may be opposite first surfaces 505, 508. First seal 140a may extend a first distance across second surface 507 of second current collector 154a, and metal liner 510 may extend proximate the first distance across the first surface 505 of the second current collector 154a. The metal liner 510 may extend beyond the first distance across the first surface 505 of the second current collector 154a towards an exterior edge of the second current collector. For example, metal liner 510 may extend past seals 140a, 140b along second current collector 154a and third current collector 152b, which may limit any exposed gap region of the current collectors.

Figure 6:
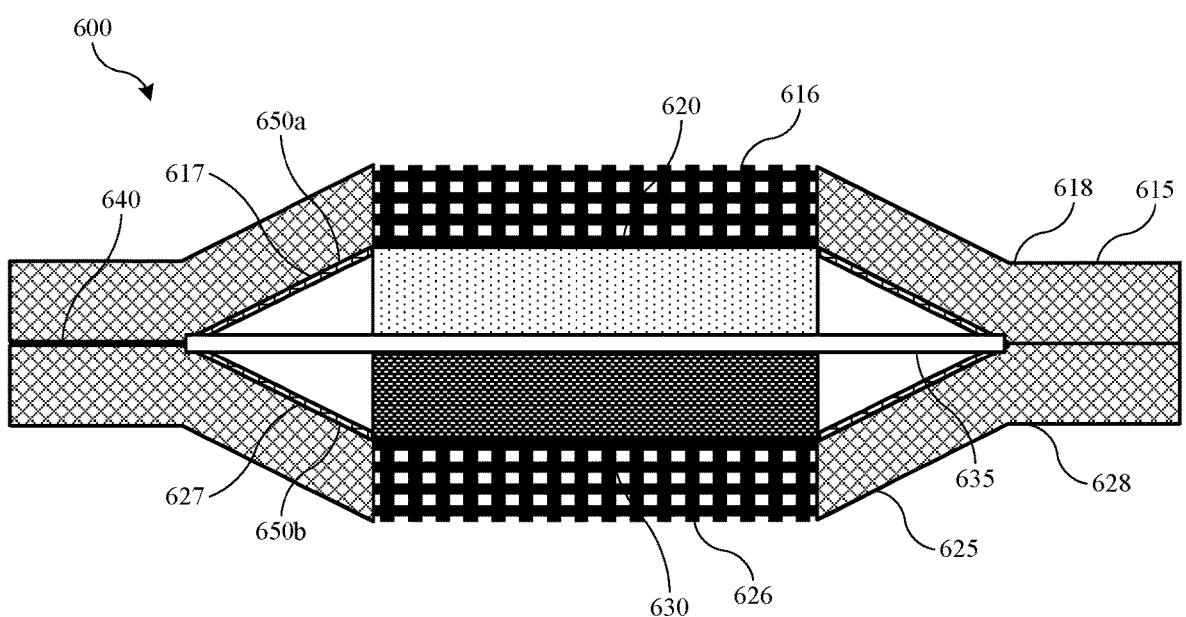
FIG. 6 shows a schematic cross-sectional view of a portion of an exemplary battery cell according to embodiments of the present technology.

FIG. 6 shows a schematic cross-sectional view of a portion of an exemplary battery cell 600 according to embodiments of the present technology. Exemplary battery cell 600 may include another current collector configuration that may provide adjusted or modified in-plane current flow according to the present technology. Battery cell 600 may include some or all of the components of any of the other cell designs discussed elsewhere. Battery cell 600 may include a first current collector 615 coupled with a first cathode material 620 on a first surface 617 of first current collector 615. Battery cell 610 may also include a second current collector 625 coupled with a first anode material 630 on a first surface 627 of second current collector 625. Battery cell 610 may also include a separator 635 disposed between the cathode material 620 and the anode material 630.

First current collector 615 and second current collector 625 may be or include a polymer in embodiments, and the current collectors 615, 625 may include a seal between them as previously described, or may be directly sealed together as illustrated. The current collectors may be directly sealed in embodiments in which the current collectors may include an active region and an inactive region. For example, a first area 616 of first current collector 615 may include a conductive material within the first area 616, which may allow through-plane conductivity in embodiments. A second area 618 of first current collector 615 may not include conductive material, and thus may not be at cathode potential in embodiments. Similarly, a first area 626 of second current collector 625 may include a conductive material within the first area 626, which may allow through-plane conductivity, while second area 628 may not include conductive material. Cathode material 620 may contact first area 616 of first current collector 615, and anode material 630 may contact first area 626 of second current collector 625. Second areas 618, 628 may be coupled together at seal 640 and not short the battery cell 600, because the areas may not include any conductive components, and may be inactive. Seal 640 may be formed along first surface 617 of first current collector 615 and along first surface 627 of second current collector 625.

A metal material 650a may be coupled with the first surface 617 of first current collector 615 between seal 640 and cathode active material 620, and may extend between the first area 616 and the second area 618 of first current collector 615. Metal material 650a may provide a barrier for water permeation as previously described, and may contact seal 640 on a first end of the metal material 650a, and may contact cathode active material 620 on a second end of the metal material 650a opposite the first end. Metal material 650b may be similarly coupled with second current collector 625, and may extend along first surface 627 from seal 640 to anode active material 630 between first area 626 and second area 628. Metal material 650b may contact seal 640 on a first end, and may contact anode active material 630 on a second end opposite the first end. Because metal material 650 is included within the battery, different materials may be used for metal material 650 along the first current collector 615 and the second current collector 625. For example, metal material 650a may be aluminum, or a material that may operate at cathode potential, and metal material 650b may be copper, or a material that may operate at anode potential. In some embodiments, metal material 650a, 650b may be the same material such as stainless steel, or a material that may operate at both potentials.

Figure 7:
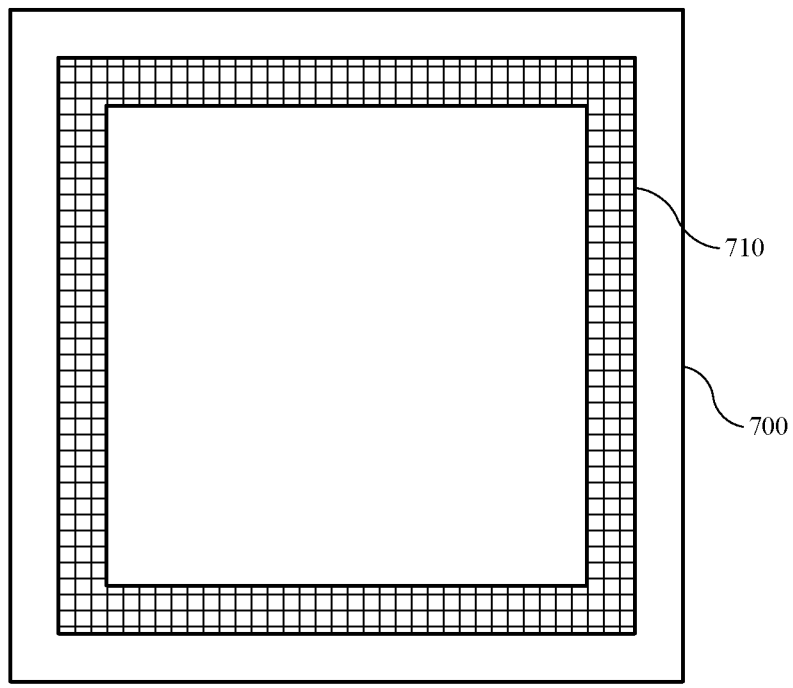
FIG. 7 shows a plan view of an exemplary current collector according to embodiments of the present technology.

Turning to FIG. 7 shows a plan view of an exemplary current collector 700 according to embodiments of the present technology. Current collector 700 may be similar to any of the current collectors previously described, and may illustrate an example of how a metal material 710 may be applied to a current collector. Current collector 700 may be similar to current collectors previously described in which metal material 710 may be applied to an external surface of the current collector 700, while an active material may be applied to an inner surface. Metal material 710 may be applied about a region corresponding to a gap where active material and/or seal or sealing material may be not disposed on the corresponding inner surface. Accordingly, the gap region may provide a path for water permeation for non-metal current collectors. By applying, forming, or laminating metal material 710 onto current collector 700, water permeation and electrolyte vapor release may be limited or reduced.

Figure 8:
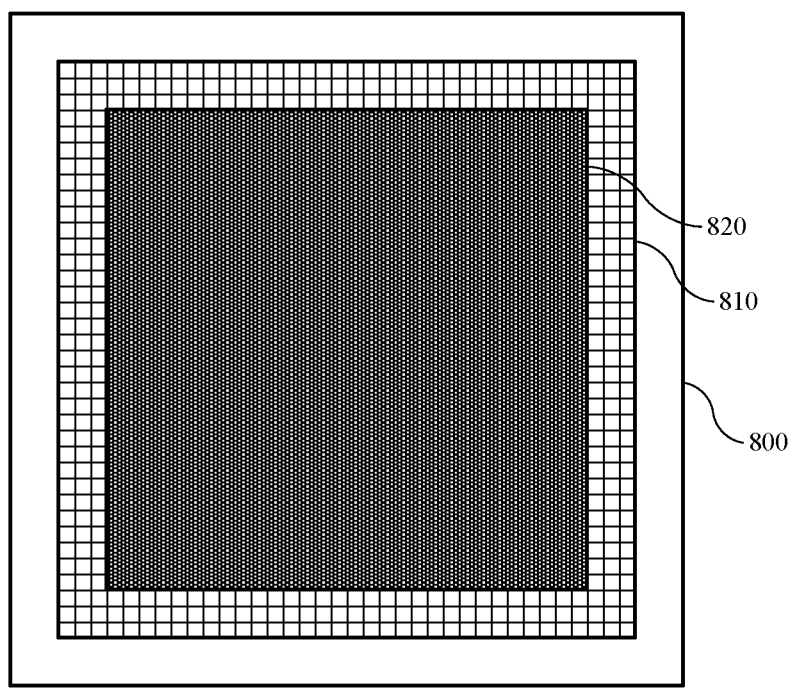
FIG. 8 shows a plan view of an exemplary current collector according to embodiments of the present technology.

FIG. 8 shows a plan view of an exemplary current collector 800 according to embodiments of the present technology. Current collector 800 may be similar to any of the current collectors previously described, and may illustrate an example of how a metal material 810 may be applied to a current collector on an interior surface similar to current collectors described above with FIG. 6. Current collector 800 may have metal material 810 formed on or applied to a region corresponding to a gap region, and may then have active material 820 applied to the current collector. Metal material 810 may also be applied about a region corresponding to a gap where active material and/or seal or sealing material may not be disposed on the corresponding inner surface. By utilizing a targeted application of metal and barrier materials as described throughout the disclosure, water permeation into a battery cell may be reduced, and device performance and lifetime may be extended.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery cell comprising:
a first current collector;
a second current collector, wherein at least one of the first current collector and the second current collector comprises a non-metal current collector;
a seal between an edge region of the first current collector and an edge region of the second current collector, wherein the seal contacts a first surface of the first current collector and a first surface of the second current collector; and
a metal material coupled with the non-metal current collector on a second surface of the non-metal current collector opposite the first surface, wherein an anode active material contacts the first surface of the first current collector, wherein a cathode active material contacts the first surface of the second current collector, and wherein a gap in coverage extends across the first surface of the non-metal current collector between the seal and the active material associated with the non-metal current collector.

2. The battery cell of claim 1, wherein the metal material is located along a region of the second surface of the non-metal current collector opposite the gap in coverage across the first surface of the non-metal current collector.

3. The battery cell of claim 1, wherein the metal material does not fully extend across a region of the second surface of the non-metal current collector opposite a region of the first surface of the non-metal current collector contacting the active material associated with the non-metal current collector.

4. The battery cell of claim 1, wherein the non-metal current collector comprises a polymer current collector.

5. The battery cell of claim 1, wherein the metal material comprises aluminum.

6. The battery cell of claim 1, wherein both the first current collector and the second current collector comprise a polymer.

7. A multi-cell battery comprising:
a first cell including a first current collector, a first anode, a first cathode, and a second current collector;
a second cell including a third current collector, a second anode, a second cathode, and a fourth current collector, wherein the second current collector and the third current collector are coupled with one another across a portion of a first surface of each of the second current collector and the third current collector;
a first seal between the first current collector and the second current collector;
a second seal between the third current collector and the fourth current collector; and
a metal liner coupled with the first surface of each of the second current collector and the third current collector.

8. The multi-cell battery of claim 7, wherein the metal liner extends along the first surface of each of the second current collector and the third current collector proximate an intersection of the second current collector and the third current collector.

9. The multi-cell battery of claim 7, further comprising an insulating tape disposed about an edge region of the first current collector and the second current collector.

10. The multi-cell battery of claim 9, wherein the metal liner extends along the second current collector beneath the insulating tape.

11. The multi-cell battery of claim 7, wherein the metal liner comprises aluminum.

12. The multi-cell battery of claim 7, wherein the second current collector and the third current collector comprise a polymer.

13. The multi-cell battery of claim 7, wherein the metal liner extends proximate an external edge of the second current collector and the third current collector.

14. The multi-cell battery of claim 7, wherein the first seal extends a first distance across a second surface opposite the first surface of the second current collector, and wherein the metal liner extends proximate the first distance across the first surface of the second current collector.

15. The multi-cell battery of claim 14, wherein the metal liner extends beyond the first distance across the first surface of the second current collector towards an exterior edge of the second current collector.

16. A battery cell comprising:
a first current collector;

a second current collector;

a cathode active material coupled with a first area of a first surface of the first current collector;

an anode active material coupled with a first area of a first surface of the second current collector;

a seal between a second area of the first surface of the first current collector and coupled with a second area of the first surface of the second current collector; and a metal material coupled with the first surface of at least one of the first current collector and the second current collector between the first area of the first surface and the second area of the first surface of a respective current collector for the first area and the second area.

17. The battery cell of claim 16, wherein the metal material comprises stainless steel.

18. The battery cell of claim 16, wherein the metal material contacts the seal on a first end of the metal material, and wherein the metal material contacts one of the anode active material or the cathode active material on a second end of the metal material opposite the first end of the metal material.

* * * * *